Oct. 11, 1927.
T. THORNYCROFT
CYLINDER OF INTERNAL COMBUSTION ENGINE
Filed Feb. 18, 1926
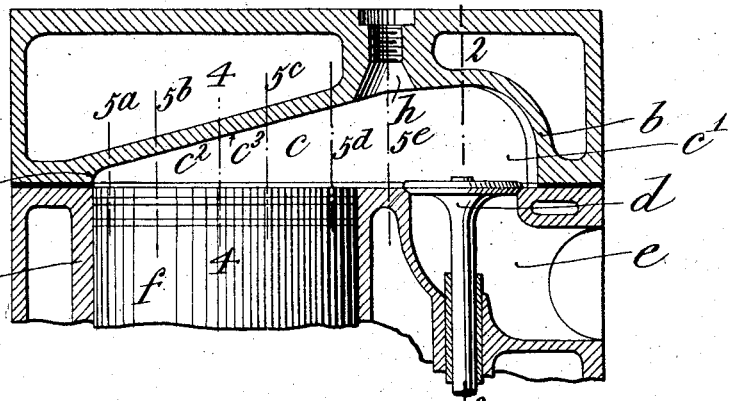
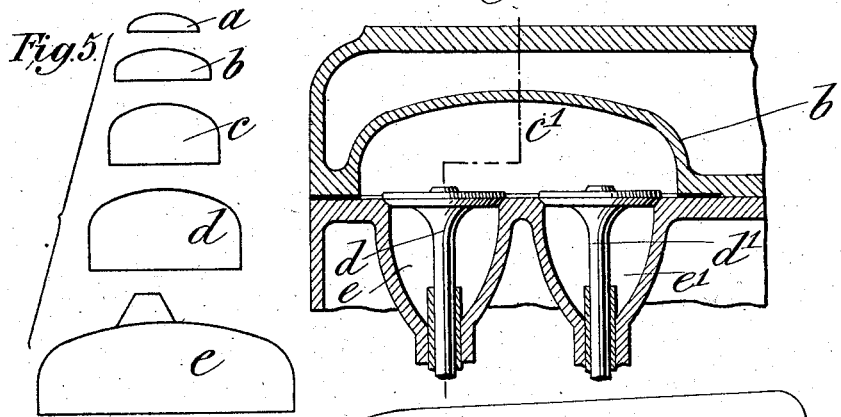
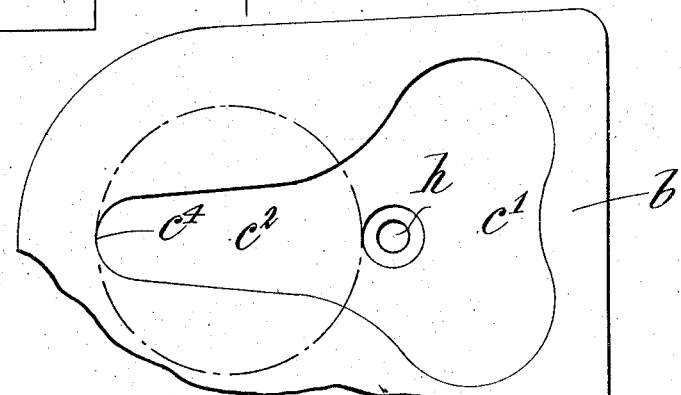
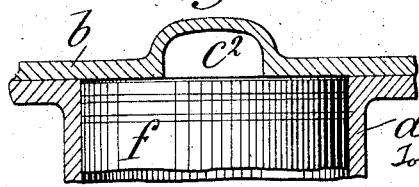

Patented Oct. 11, 1927.

1,644,860

UNITED STATES PATENT OFFICE.

TOM THORNYCROFT, OF WESTMINSTER, ENGLAND.

CYLINDER OF INTERNAL-COMBUSTION ENGINE.

Application filed February 18, 1926, Serial No. 89,196, and in Great Britain April 25, 1925.

With the object of obtaining increased efficiency of an internal combustion engine, the cylinders of such engine have been provided at their combustion ends with heads or covers formed with combustion chambers or cavities designed to produce turbulence of the combustible mixture of the fuel and air employed, at the end of the compression stroke of the piston and during the ignition of the charge. When however the combustion chamber is located at one side of the axis of the cylinder, as heretofore, it is found that this gives rise to piston slap and lubrication troubles.

The present invention has for its object to provide a cylinder with a head or cover having therein a combustion chamber or cavity so constructed that a turbulent state of the mixture of fuel and air admitted thereto will be produced but so that the disadvantages above referred to shall be avoided.

For this purpose, the cylinder, or each cylinder, of an internal combustion engine, is provided with a combustion head or cover having therein a turbulence chamber or casing so constructed and arranged that the outlet port or passage thereof communicates with the cylinder over the crown of the piston therein in such a manner that the combustible charge admitted to the turbulence chamber or casing and thence to the cylinder, will, during its compression and ignition, cause practically no tendency of the piston to rock within the cylinder.

Such a turbulence chamber or cavity can be variously constructed to attain the end in view.

In the accompanying illustrative drawings, Fig. 1 is a section on the line 1—1 of Fig. 2 and Fig. 2 a section of the line 2—2 of Fig. 1, of part of an engine cylinder with combustion head or cover with a turbulence chamber embodying the present invention. Fig. 3 is an underside view of the combustion head with turbulence chamber shown in Figs. 1 and 2. Fig. 4 is a cross section of the turbulence chamber on the line 4—4 of Fig. 1. Fig. 5 shows a number of additional cross sections of the turbulence chamber taken on the successive lines $5^a$, $5^b$, $5^c$, $5^d$, $5^e$ from left to right of Fig. 1.

In this construction, an engine cylinder $a$ is provided with a combustion head or cover $b$ having therein an open bottom turbulence chamber $c$ of gradually decreasing cross sectional area from its inlet end $c^1$, which is broad and arranged over the fuel inlet and exhaust valves $d$ and $d^1$ and ports $e$ and $e^1$ (Figs. 1 and 2), to its outlet end $c^2$ which is comparatively narrow compared with the diameter of the piston and extends diametrically, symmetrically and entirely across the end of the cylinder $a$ and the piston $f$ therein. By this construction there are two similar and opposite segmental shaped areas of the cylinder end covered by the combustion head $b$ so that air and combustible gas or vapour admitted to the cylinder on the suction stroke will, when the piston nearly completes its compression stroke, be compressed and be violently stirred up by their ejection in opposite directions from the narrow spaces between the piston and the combustion head and through the outlet opening $c^2$ of the turbulence chamber. As seen in cross section, the chamber $c$ is, in the example shown of arched or concave shape, in longitudinal section it is of concave shape at its inlet end $c^1$ and merges into an inclined line $c^3$ terminating at the side of the cylinder remote from the valves, and in plan (Fig. 3) it is of curvilinear shape comprising two part circular portions located above the valves $d$, $d^1$ and a centrally disposed lateral outlet portion $c^2$ that may as shown be of slightly tapering shape, having a curved remote end $c^4$ and blending into the part circular portions which also blend one into the other at the opposite side, it may be by a concave line. Such a combustion head is provided, as usual, with a hole $h$ opening into the turbulence chamber $c$ for the reception of a sparking plug.

With a turbulence chamber constructed as described, the piston will have no tendency to rock during compression and ignition of a charge and cause lubrication trouble, and an increased efficiency, as regards power and fuel consumption, will be obtained.

What I claim is:—

1. A combined cylinder, combustion head and working piston for an internal combustion engine, said combustion head having therein a turbulence chamber extending from a position to one side of the cylinder, where are situated fuel inlet and exhaust valves, and communicating with the interior of the cylinder through a diametrically and symmetrically arranged outlet of less width than the diameter of the cylinder and extending entirely across the diameter of the cylinder.

2. A combined cylinder, combustion head and working piston for an internal combustion engine, said combustion head having therein a turbulence chamber of gradually decreasing cross sectional area from its inlet end located to one side of said cylinder to its outlet end which communicates with said cylinder through an outlet that extends diametrically, symmetrically and entirely across the end of the cylinder and is of less width than the diameter of the cylinder.

3. A combined cylinder, combustion head and working pistons, according to claim 2, wherein the turbulence chamber within the combustion head is of concave shape in cross section.

4. A combined cylinder, combustion head and working piston according to claim 2, wherein the turbulence chamber within the combustion head is of concave shape in longitudinal section at its inlet end, located to one side of the cylinder, and merges into an inclined line terminating at the side of the cylinder remote from the inlet side and above the piston in said cylinder.

5. A combined cylinder, combustion head and working piston for an external combustion engine, and fuel inlet and exhaust valves located at the outer side of said cylinder, the said combustion chamber having therein a turbulence chamber that is of curvilinear shape in plan and comprises two part circular portions blending one into the other and located respectively above the said fuel inlet and exhaust valves and constituting the inlet end of the said chamber, and a centrally disposed lateral outlet portion of less width than the inlet portion and of less width than the diameter of the cylinder, said outlet portion blending into said part circular portions and extending diametrically across the adjacent end of the said cylinder.

6. For an internal combustion engine having a cylinder and a working piston therein, a combustion head having therein a turbulence chamber of greater horizontal length than the diameter of the engine cylinder with which the said combustion head is to be used and of gradually decreasing cross sectional area from its inlet end to its outlet end, its outlet end being of less width than the diameter of the said cylinder and adapted to extend diametrically across the said cylinder when the combustion head is applied thereto.

7. For an internal combustion engine comprising a cylinder and a working piston therein, a combustion head having a central longitudinally disposed turbulence chamber therein of concave shape in cross section and of gradually decreasing cross sectional area from its inlet end portion to its outlet end portion, the latter portion being of less width than the diameter of the engine cylinder with which the combustion head is to be used and arranged to extend diametrically across the end of the said cylinder.

8. For an internal combustion engine comprising a cylinder and a working piston therein, a combustion head having a central longitudinally disposed turbulence chamber therein of concave shape in cross section and of gradually decreasing cross sectional area and width from its inlet end portion to its outlet end portion, the latter portion being of less width than the diameter of the engine cylinder with which the combustion head is to be used and arranged to extend diametrically across the end of the said cylinder.

Signed at London, England, this fifth day of February, 1926.

TOM THORNYCROFT.